US011377099B2

(12) United States Patent
Shoda et al.

(10) Patent No.: US 11,377,099 B2
(45) Date of Patent: Jul. 5, 2022

(54) PARKING ASSIST SYSTEM

(71) Applicant: HONDA MOTOR CO., LTD., Tokyo (JP)

(72) Inventors: Yasushi Shoda, Saitama (JP); Syoichi Kobayashi, Saitama (JP); Yuki Hara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/215,795

(22) Filed: Mar. 29, 2021

(65) Prior Publication Data

US 2021/0300341 A1  Sep. 30, 2021

(30) Foreign Application Priority Data

Mar. 31, 2020 (JP) .............................. JP2020-063595

(51) Int. Cl.
| | |
|---|---|
| *B60W 30/06* | (2006.01) |
| *G06K 9/00* | (2022.01) |
| *B60K 35/00* | (2006.01) |
| *G06V 20/58* | (2022.01) |
| *G06V 20/56* | (2022.01) |

(52) U.S. Cl.
CPC ............ *B60W 30/06* (2013.01); *B60K 35/00* (2013.01); *G06V 20/58* (2022.01); *G06V 20/586* (2022.01); *G06V 20/588* (2022.01); *B60K 2370/1434* (2019.05); *B60K 2370/152* (2019.05); *B60K 2370/175* (2019.05)

(58) Field of Classification Search
CPC ..... B60W 30/06; G06V 20/58; G06V 20/586; G06V 20/588; B60K 35/00; B60K 2370/175; B60K 2370/152; B60K 2370/1434

See application file for complete search history.

(56) References Cited

U.S. PATENT DOCUMENTS

| | | | | |
|---|---|---|---|---|
| 9,043,083 | B2 * | 5/2015 | Kadowaki | ............ B62D 15/027 701/36 |
| 9,522,675 | B1 * | 12/2016 | You | ..................... B62D 15/0285 |
| 9,862,416 | B2 * | 1/2018 | Imai | ....................... G08G 1/168 |

(Continued)

FOREIGN PATENT DOCUMENTS

| | | | |
|---|---|---|---|
| CN | 108609010 A | * | 10/2018 |
| JP | 2014034322 A | | 2/2014 |
| WO | WO-2020013053 A1 | * | 1/2020 ......... B62D 15/0285 |

*Primary Examiner* — Chico A Foxx

(74) *Attorney, Agent, or Firm* — Armstrong Teasdale LLP

(57) ABSTRACT

A parking assist system includes: an external environment information acquiring device, a parking space extracting device, a display device, a selection input member, and a control device. The control device is configured to set a parking position candidate at a prescribed position in a parking space, to set the parking position candidate selected by a user as a target parking position, to calculate a first trajectory to the target parking position, and to execute a first driving process to autonomously move a vehicle along the first trajectory. The control device is configured to set a corrected parking position different from the target parking position, to calculate a second trajectory from the target parking position to the corrected parking position, and to execute a second driving process to autonomously move the vehicle along the second trajectory.

4 Claims, 7 Drawing Sheets

(56) References Cited

U.S. PATENT DOCUMENTS

| | | | |
|---|---|---|---|
| 10,685,567 B2* | 6/2020 | Blinkle | G08G 1/147 |
| 10,800,404 B2* | 10/2020 | Kato | G05D 1/0212 |
| 10,807,642 B2* | 10/2020 | Ebner | B60W 30/18036 |
| 2011/0087406 A1* | 4/2011 | Barth | B60Q 1/48 |
| | | | 701/41 |
| 2013/0166190 A1* | 6/2013 | Ikeda | B62D 15/0285 |
| | | | 701/400 |
| 2015/0344028 A1* | 12/2015 | Gieseke | B62D 15/028 |
| | | | 701/1 |
| 2016/0236680 A1* | 8/2016 | Lavoie | B62D 15/0285 |
| 2017/0305467 A1* | 10/2017 | Nordbruch | G08G 1/146 |
| 2018/0178840 A1* | 6/2018 | Li | B60W 30/06 |
| 2018/0339701 A1* | 11/2018 | Kwon | B62D 15/0285 |
| 2019/0066514 A1* | 2/2019 | Yamamura | G08G 1/168 |
| 2019/0276010 A1* | 9/2019 | Mason | G08G 1/141 |
| 2019/0303691 A1* | 10/2019 | Maeda | G06K 9/629 |
| 2020/0079359 A1* | 3/2020 | Tsujino | G05D 1/0088 |
| 2020/0104613 A1* | 4/2020 | Hirai | G06K 9/50 |
| 2020/0265605 A1* | 8/2020 | Kaneko | G06T 7/73 |
| 2020/0361451 A1* | 11/2020 | Noguchi | G08G 1/144 |
| 2020/0410860 A1* | 12/2020 | Jeong | B62D 15/0285 |
| 2021/0101586 A1* | 4/2021 | Woo | B60W 30/06 |
| 2021/0118299 A1* | 4/2021 | Yata | B60R 99/00 |
| 2021/0213939 A1* | 7/2021 | Woo | G05D 1/0016 |

\* cited by examiner

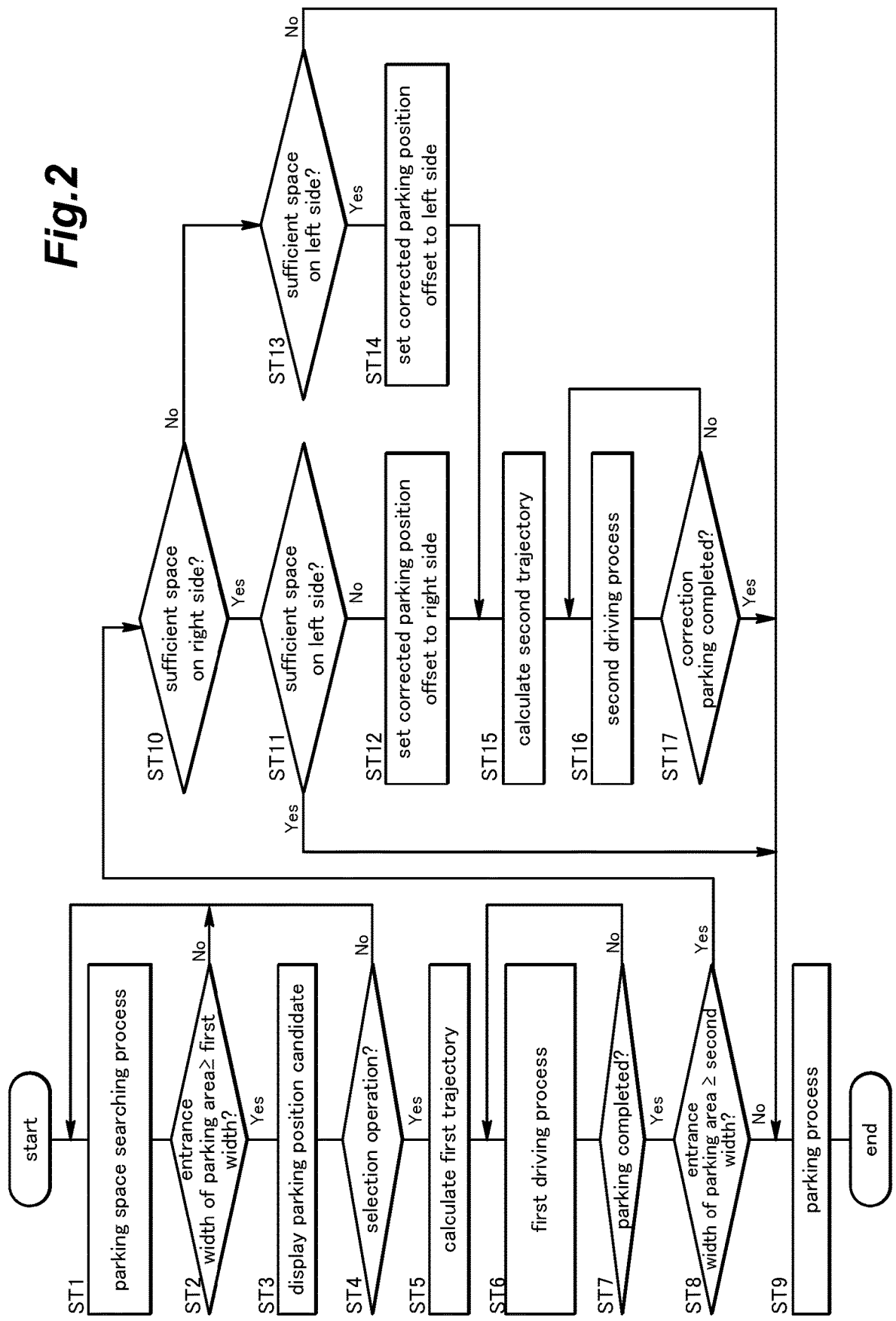

PARKING ASSIST SYSTEM

TECHNICAL FIELD

The present invention relates to a parking assist system configured to autonomously move a vehicle and to park the vehicle.

BACKGROUND ART

There is a known parking assist device that assists a vehicle in moving so as to execute perpendicular parking to a parking area. For example, JP2014-34322A discloses a parking assist device that can easily move a vehicle to a side desired by a driver when executing perpendicular parking to a parking area adjacent to one or more obstacles. In this parking assist device, when a trigger operation detecting means detects an operation input by a driver (user) on a prescribed operation switch provided in the vehicle, a correction direction determining means determines the direction in which a target parking position should be shifted, and thus shifts the target parking position in the determined direction.

If an operation input on a door mirror storage switch (namely, an operation input to store a door mirror) is detected and an obstacle is adjacent to one side of the parking area, the above parking assist device recognizes driver's intention to move the vehicle to a side on which the obstacle is present. On the other hand, if obstacles are adjacent to both sides of the parking area, the above parking assist device determines the direction in which the vehicle should be moved according to a signal from a switch (such as a blinker switch) for indicating a lateral direction.

However, the parking assist device disclosed in JP2014-34322A does not shift the target parking position without the operation input by the driver, even if an obstacle is detected. Accordingly, the target parking position cannot be shifted to an appropriate position unless the driver is familiar with the operation input or unless the driver is aware of the obstacle. Further, if an obstacle is present on one side of the vehicle, the target parking position is shifted to the side of the obstacle. However, if the vehicle is parked in such a target parking position, the opening/closing of the door may be hindered.

SUMMARY OF THE INVENTION

In view of such a problem of the prior art, a primary object of the present invention is to provide a parking assist system that can park a vehicle in an appropriate position in a parking area without an operation input by a driver.

To achieve such an object, one embodiment of the present invention provides a parking assist system (1) including: an external environment information acquiring device (7 (18, 19)) configured to acquire external environment information around a vehicle; a parking space extracting device (15 (41)) configured to extract an available parking space (51) delimited by one or more delimiting lines (50) based on first external environment information which is the external environment information acquired by the external environment information acquiring device; a display device (32) configured to display a parking position candidate (53) set in the parking space; a selection input member (35, 32) configured to receive a selection operation by a user, the selection operation being an operation to select the parking position candidate displayed on the display device; and a control device (15 (43, 44)) configured to set the parking position candidate at a prescribed position in the parking space (ST3), to set the parking position candidate selected by the user via the selection input member as a target parking position (55) (ST5), to calculate a first trajectory (56) to the target parking position (ST5), and to execute a first driving process to autonomously move the vehicle along the first trajectory (ST6), wherein the control device is configured to set a corrected parking position (58) different from the target parking position based on second external environment information which is the external environment information acquired by the external environment information acquiring device during and/or after the first driving process (ST12, ST14), to calculate a second trajectory (60) from the target parking position to the corrected parking position (ST15), and to execute a second driving process to autonomously move the vehicle along the second trajectory (ST16).

When setting the parking position candidate, the external environment information acquiring device may not be able to get information about the back side of the parking space, and thus the first external environment information may not include the information about the back side of the parking space. Accordingly, the extracted parking space may not form a parking area where no obstacle is present from the entrance side to the back side. According to the above configuration, even in such a case, it is possible to execute the first driving process to the target parking position based on the first external environment information, to set the corrected parking position based on the second external environment information acquired during and/or after the first driving process without the operation input by the driver during the first driving process, and to move the vehicle to the corrected parking position according to the second driving process. Accordingly, it is possible to park the vehicle in an appropriate position according to the surrounding condition of the parking space.

In the above configuration, preferably, the control device is configured to set the target parking position at a central position of the parking space in a width direction, and to set the corrected parking position at a position offset from the target parking position in the width direction.

According to this configuration, when the vehicle moves to the target parking position set in the center between the left and right delimiting lines that define the parking space, the external environment information acquiring device can accurately acquire the shape of the space (more specifically, the space on the back side of the parking space) that extends so as to correspond to the target parking position. Further, since the vehicle moves to the corrected parking position offset from the target parking position in the width direction, the occupant can easily alight from the vehicle.

In the above configuration, preferably, the second external environment information includes positional information about obstacles on both lateral sides of the vehicle detected by the external environment information acquiring device while the vehicle is moving to the target parking position, and in a case where a minimum distance (Dmin) in the width direction to either of the obstacles on both lateral sides is equal to or less than a prescribed threshold (Dth) (ST10: No), the control device sets the corrected parking position at a position offset from the central position in such a direction that the minimum distance is increased (ST12, ST14).

According to this configuration, the minimum distance from a side part of the vehicle body to either of the obstacles on both lateral sides is increased, so that the occupant can easily alight from the vehicle to both lateral sides thereof.

In the above configuration, preferably, the control device is configured to set the corrected parking position in the parking space such that the corrected parking position is parallel to the delimiting lines (ST12, ST14).

According to this configuration, it is possible to park the vehicle in the position and direction corresponding to the surrounding situation and appropriate for the parking space.

In the above configuration, preferably, in a case where an entrance width of a parking area (52) corresponding to the parking space is equal to or more than a first width (Wf1) which is greater than a vehicle width (Wv) (ST2: Yes), the control device sets the parking position candidate (ST3), and in a case where the entrance width of the parking area corresponding to the target parking position is equal to or more than a second width (Wf2) which is greater than the first width (ST8: Yes), the control device executes the second driving process.

According to this configuration, the second driving process is executed in a case where the entrance width of the parking area acquired based on the second external environment information is equal to or more than the second width, which is greater than the first width necessary for setting the parking position candidate based on the first external environment information. Namely, the second driving process is executed in a case where the corrected parking position can be offset from the target parking position to some extent. Accordingly, the second driving process can surely make it easier for the occupant to alight from the vehicle. Further, the parking space extracted based on the first external environment information can be the parking position candidate if the corresponding parking area has the entrance width of the first width, which is less than the second width. Accordingly, many parking position candidates can be displayed on the display device and thus presented to the driver.

In the above configuration, preferably, in a case where the entrance width of the parking area corresponding to the target parking position is smaller than the second width (ST8: No), the control device does not execute the second driving process.

According to this configuration, in a case where the offsetable amount of the corrected parking position from the target parking position is small, the second driving process is not executed. Accordingly, it is possible to prevent the driver from being annoyed by the parking assistance.

In the above configuration, preferably, upon recognizing entrance side parts of the delimiting lines on both lateral sides, the parking space extracting device extracts the available parking space (ST1).

According to this configuration, even if information about the back side of the parking zone between two delimiting lines is not included in the first external environment information, this parking zone can be detected as the available parking space and thus presented to the driver as the parking position candidate.

Thus, according to the above configurations, it is possible to provide a parking assist system that can park a vehicle in an appropriate position in a parking area without an operation input by a driver.

BRIEF DESCRIPTION OF THE DRAWING(S)

FIG. 2 is a flowchart of an automatic parking process;

DESCRIPTION OF THE PREFERRED EMBODIMENT(S)

In the following, an embodiment of the present invention will be described in detail with reference to the drawings.

A parking assist system 1 is mounted on a vehicle such as an automobile provided with a vehicle control system 2 configured to move the vehicle autonomously.

Figure 1:
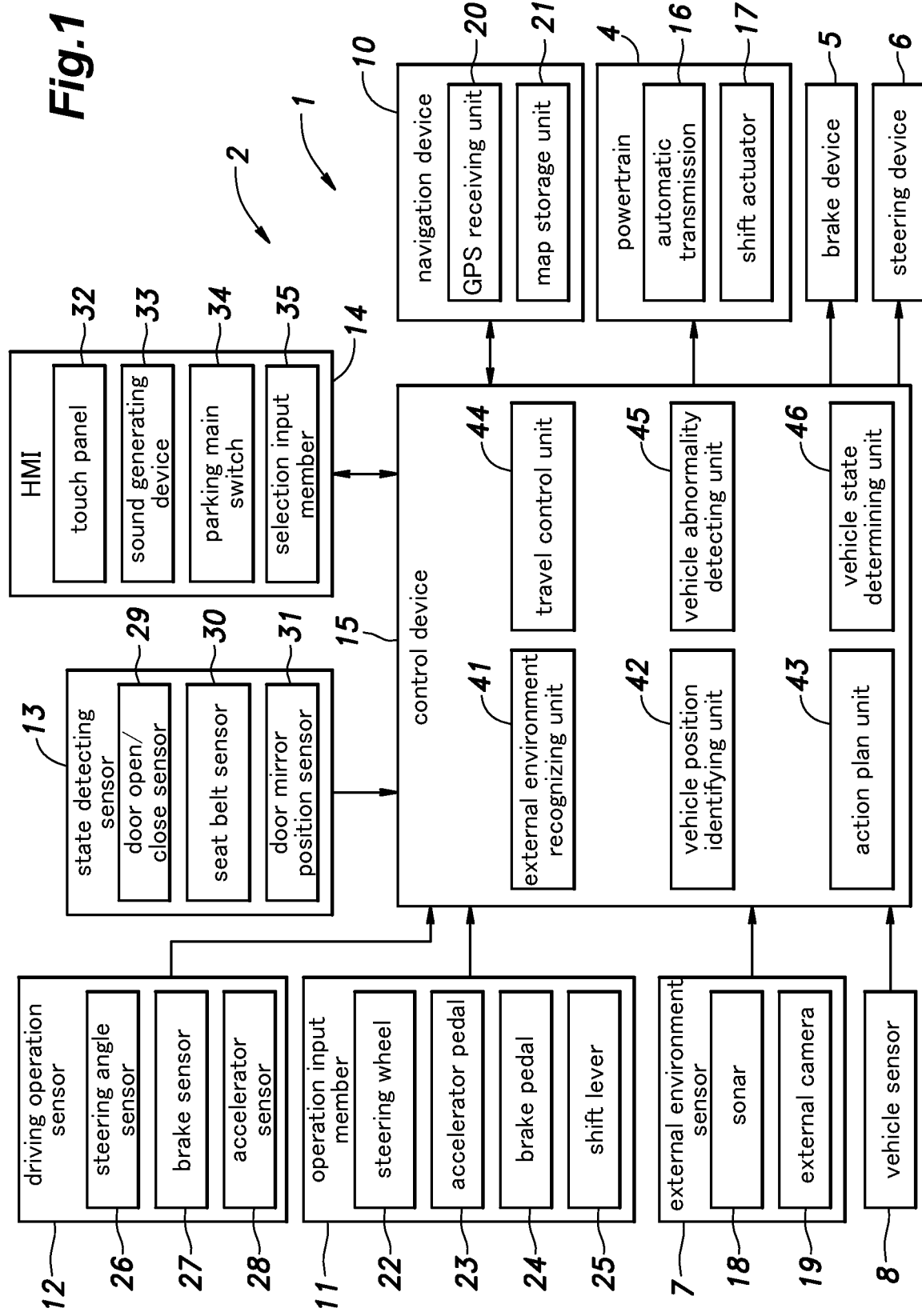
FIG. 1 is a functional block diagram of a vehicle provided with a parking assist system according to an embodiment of the present invention.

As shown in FIG. 1, the vehicle control system 2 includes a powertrain 4, a brake device 5, a steering device 6, an external environment sensor 7, a vehicle sensor 8, a navigation device 10, an operation input member 11, a driving operation sensor 12, a state detecting sensor 13, a human machine interface (HMI) 14, and a control device 15. The above components of the vehicle control system 2 are connected to each other so that signals can be transmitted therebetween via communication means such as a Controller Area Network (CAN).

The powertrain 4 is a device configured to apply a driving force to the vehicle. The powertrain 4 includes a power source and a transmission, for example. The power source includes at least one of an internal combustion engine, such as a gasoline engine and a diesel engine, and an electric motor. In the present embodiment, the powertrain 4 includes an automatic transmission 16 and a shift actuator 17 for changing a shift position of the automatic transmission 16 (a shift position of the vehicle). The brake device 5 is a device configured to apply a brake force to the vehicle. For example, the brake device 5 includes a brake caliper configured to press a brake pad against a brake rotor and an electric cylinder configured to supply an oil pressure to the brake caliper. The brake device 5 may include an electric parking brake device configured to restrict rotations of wheels via wire cables. The steering device 6 is a device for changing a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 serves as an external environment information acquiring unit for detecting electromagnetic waves, sound waves, and the like from the surroundings of the vehicle to detect an object outside the vehicle and to acquire surrounding information of the vehicle. The external environment sensor 7 includes sonars 18 and external cameras 19. The external environment sensor 7 may further include a millimeter wave radar and/or a laser lidar. The external environment sensor 7 outputs a detection result to the control device 15.

Each sonar 18 consists of a so-called ultrasonic sensor. Each sonar 18 emits ultrasonic waves to the surroundings of the vehicle and captures the ultrasonic waves reflected by an object around the vehicle thereby to detect a position (distance and direction) of the object. Multiple sonars 18 are provided at each of a rear part and a front part of the vehicle. In the present embodiment, two pairs of sonars 18 are provided on a rear bumper so as to be spaced laterally from each other, two pairs of sonars 18 are provided on a front bumper so as to be spaced laterally from each other, one pair of sonars 18 is provided at a front end portion of the vehicle such that the two sonars 18 forming the pair are provided on left and right side faces of the front end portion of the vehicle, and one pair of sonars 18 is provided at a rear end portion of the vehicle such that the two sonars 18 forming the pair are provided on left and right side faces of the rear end portion of the vehicle. That is, the vehicle is provided with six pairs of sonars 18 in total. The sonars 18 provided on the rear bumper mainly detect positions of objects behind the vehicle. The sonars 18 provided on the front bumper mainly detect positions of objects in front of the vehicle. The sonars 18 provided at the left and right side faces of the front end portion of the vehicle detect positions of objects on left and right outsides of the front end portion of the vehicle, respectively. The sonars 18 provided at the left and right side faces of the rear end portion of the vehicle detect positions of objects on left and right outsides of the rear end portion of the vehicle, respectively.

The external cameras 19 are devices configured to capture images around the vehicle. Each external camera 19 consists of a digital camera using a solid imaging element such as a CCD or a CMOS, for example. The external cameras 19 include a front camera for capturing an image in front of the vehicle and a rear camera for capturing an image to the rear of the vehicle. The external cameras 19 may include a pair of left and right side cameras that are provided in the vicinity of the door mirrors of the vehicle to capture images on left and right sides of the vehicle.

The vehicle sensor 8 includes a vehicle speed sensor configured to detect the speed of the vehicle, an acceleration sensor configured to detect the acceleration of the vehicle, a yaw rate sensor configured to detect the angular velocity around a vertical axis of the vehicle, and a direction sensor configured to detect the direction of the vehicle. For example, the yaw rate sensor consists of a gyro sensor.

The navigation device 10 is a device configured to obtain a current position of the vehicle and provides route guidance to a destination and the like. The navigation device 10 includes a GPS receiving unit 20 and a map storage unit 21. The GPS receiving unit 20 identifies a position (latitude and longitude) of the vehicle based on a signal received from an artificial satellite (positioning satellite). The map storage unit 21 consists of a known storage device such as a flash memory or a hard disk, and stores map information.

The operation input member 11 is provided in a vehicle cabin to receive an input operation performed by the occupant (an example of the user) to control the vehicle. The operation input member 11 includes a steering wheel 22, an accelerator pedal 23, a brake pedal 24 (brake input member), and a shift lever 25 (a shift member). The shift lever 25 is configured to receive an operation for selecting the shift position of the vehicle.

The driving operation sensor 12 detects an operation amount of the operation input member 11. The driving operation sensor 12 includes a steering angle sensor 26 configured to detect a steering angle of the steering wheel 22, a brake sensor 27 configured to detect a pressing amount of the brake pedal 24, and an accelerator sensor 28 configured to detect a pressing amount of the accelerator pedal 23. The driving operation sensor 12 outputs a detected operation amount to the control device 15.

The state detecting sensor 13 is a sensor configured to detect a change in a state of the vehicle according to an operation by the occupant. The operation by the occupant detected by the state detecting sensor 13 includes an operation indicating an alighting intention (intention to alight from the vehicle) of the occupant and an operation indicating absence of an intention of the occupant to check the surroundings of the vehicle during an autonomous parking operation or an autonomous unparking operation. The state detecting sensor 13 includes, as sensors for detecting the operation indicating the alighting intention, a door open/close sensor 29 configured to detect opening and/or closing of a door of the vehicle and a seat belt sensor 30 configured to detect a fastening state of a seat belt. The state detecting sensor 13 includes, as a sensor to detect the operation corresponding to the abdicating intention, a door mirror position sensor 31 configured to detect a position of a door mirror. The state detecting sensor 13 outputs a signal indicating a detected change in the state of the vehicle to the control device 15.

The HMI 14 is an input/output device for receiving an input operation by the occupant and notifying the occupant of various kinds of information by display and/or voice. The HMI 14 includes, for example, a touch panel 32 that includes a display screen such as a liquid crystal display or an organic EL display and is configured to receive the input operation by the occupant, a sound generating device 33 such as a buzzer or a speaker, a parking main switch 34, and a selection input member 35. The parking main switch 34 receives the input operation by the occupant to execute selected one of an automatic parking process (autonomous parking operation) and an automatic unparking process (autonomous unparking operation). The parking main switch 34 is a so-called momentary switch that is turned on only while a pressing operation (pushing operation) is performed by the occupant. The selection input member 35 receives a selection operation by the occupant related to selection of the automatic parking process and the automatic unparking process. The selection input member 35 may consist of a rotary select switch, which preferably requires pressing as the selection operation.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware. Further, the functions of the control device 15 may be at least partially executed by hardware such as an LSI, an ASIC, and an FPGA, or may be executed by a combination of software and hardware.

Further, the control device 15 executes an arithmetic process according to a program and thereby performs a conversion process of an image (video) captured by the external cameras 19 so as to generate a look-down image corresponding to a plan view of the vehicle and its surrounding area and a bird's-eye image corresponding to a three-dimensional image of the vehicle and a part of its surrounding area positioned in the moving direction (travel direction)

as viewed from above. The control device 15 may generate the look-down image by combining the images of the front camera, the rear camera, and the left and right side cameras, and may generate the bird's-eye image by combining the image captured by the front camera or the rear camera facing the moving direction and the images captured by the left and right side cameras.

The parking assist system 1 is a system for executing the so-called automatic parking process and the so-called automatic unparking process, in which the vehicle is moved autonomously to a prescribed target position (a target parking position 55 shown in FIG. 4B or a target unparking position) selected by the occupant so as to park or unpark the vehicle.

The parking assist system 1 is constituted of the control device 15, the external environment sensor 7 (the sonars 18 and the external cameras 19) serving as an external environment information acquiring device, the touch panel 32 serving as a display device on which a selection operation can be performed, and the selection input member 35.

The control device 15 controls the powertrain 4, the brake device 5, and the steering device 6 so as to execute an autonomous parking operation to move the vehicle autonomously to a target parking position 55 and park the vehicle at the target parking position 55 and an autonomous unparking operation to move the vehicle autonomously to a target unparking position and unpark the vehicle at the target unparking position. In order to execute such operations, the control device 15 includes an external environment recognizing unit 41, a vehicle position identifying unit 42, an action plan unit 43, a travel control unit 44, a vehicle abnormality detecting unit 45, and a vehicle state determining unit 46.

The external environment recognizing unit 41 recognizes an obstacle (for example, a parked vehicle or a wall) that is present around the vehicle based on the detection result of the external environment sensor 7, and thereby obtains information about the obstacle. Further, the external environment recognizing unit 41 analyzes the images captured by the external cameras 19 based on a known image analysis method such as pattern matching, and thereby determines whether a wheel stopper or an obstacle is present, and obtains the size of the wheel stopper or the obstacle in a case where the wheel stopper or the obstacle is present. Further, the external environment recognizing unit 41 may calculate a distance to the obstacle based on signals from the sonars 18 to obtain the position of the obstacle.

Also, the external environment recognizing unit 41 analyzes the detection result of the external environment sensor 7 (more specifically, the images captured by the external cameras 19) based on a known image analysis method such as pattern matching. According to this analysis, the external environment recognizing unit 41 can extract, for example, a lane on a road delimited by road signs and one or more available parking spaces 51 (see FIG. 3A) delimited by one or more delimiting lines 50 such as white lines provided on a road surface, a parking lot, and the like. Namely, the external environment recognizing unit 41 is a parking space extracting device configured to extract one or more available parking spaces 51.

The vehicle position identifying unit 42 identifies the position of the vehicle (the own vehicle) based on a signal from the GPS receiving unit 20 of the navigation device 10. Further, the vehicle position identifying unit 42 may obtain the vehicle speed and the yaw rate from the vehicle sensor 8, in addition to the signal from the GPS receiving unit 20, and identify the position and posture of the vehicle by the so-called inertial navigation.

The travel control unit 44 controls the powertrain 4, the brake device 5, and the steering device 6 based on a travel control instruction from the action plan unit 43 to cause the vehicle to travel.

The vehicle abnormality detecting unit 45 detects an abnormality of the vehicle (hereinafter referred to as "vehicle abnormality") based on signals from various devices and sensors. The vehicle abnormality detected by the vehicle abnormality detecting unit 45 includes failure of various devices necessary for driving the vehicle (for example, the powertrain 4, the brake device 5, and the steering device 6) and failure of various sensors necessary for moving the vehicle autonomously (for example, the external environment sensor 7, the vehicle sensor 8, and the GPS receiving unit 20). Further, the vehicle abnormality includes failure of the HMI 14.

The vehicle state determining unit 46 acquires the state of the vehicle based on signals from various sensors provided in the vehicle, and determines whether the vehicle is in a prohibition state in which the autonomous movement (namely, the autonomous parking operation or the autonomous unparking operation) of the vehicle should be prohibited. The vehicle state determining unit 46 determines that the vehicle is in the prohibition state when the occupant performs a driving operation (override operation) of the operation input member 11. The override operation is an operation to override (cancel) the autonomous movement (namely, the autonomous parking operation or the autonomous unparking operation) of the vehicle.

More specifically, the vehicle state determining unit 46 may determine the initiation of the override operation when the pressing amount of the brake pedal 24 acquired (detected) by the brake sensor 27 has reached or exceeded a prescribed threshold (hereinafter referred to as "pressing threshold"). Additionally or alternatively, the vehicle state determining unit 46 may determine the initiation of the override operation when a pressing amount of the accelerator pedal 23 acquired (detected) by the accelerator sensor 28 has reached or exceeded a prescribed threshold. The vehicle state determining unit 46 may also determine the initiation of the override operation when a changing rate of the steering angle obtained (detected) by the steering angle sensor 26 has reached or exceeded a prescribed threshold.

Further, the vehicle state determining unit 46 determines, based on the detection result of the state detecting sensor 13, that the vehicle is in the prohibition state when the vehicle is in a state that reflects the alighting intention (intention to alight from the vehicle) of the occupant. More specifically, when the door open/close sensor 29 detects that the door is opened, the vehicle state determining unit 46 determines that the vehicle is in the prohibition state. Also, when the seat belt sensor 30 detects that the seat belt is released, the vehicle state determining unit 46 determines that the vehicle is in the prohibition state.

The action plan unit 43 executes the automatic parking process (autonomous parking operation) or the automatic unparking process (autonomous unparking operation) when the vehicle is in a prescribed state and the HMI 14 or the parking main switch 34 receives a prescribed input by the user, which corresponds to a request for the automatic parking process or the automatic unparking process. More specifically, the action plan unit 43 executes the automatic parking process in a case where a prescribed input corresponding to the automatic parking process is performed when the vehicle is stopped or the vehicle is moving at low speed equal to or less than a prescribed vehicle speed (a vehicle speed at which the parking spaces 51 can be searched for). The action plan unit 43 executes the automatic unparking process (parallel unparking process) in a case where a prescribed input corresponding to the automatic unparking process is performed when the vehicle is stopped. The selection of the process to be executed (the automatic parking process or the automatic unparking process) may be made by the action plan unit 43 based on the state of the vehicle. Alternatively, the above selection may be made by the occupant via the touch panel 32 or the selection input member 35. When executing the automatic parking process, the action plan unit 43 first causes the touch panel 32 to display a parking search screen for displaying one or more parking position candidates 53. When the target parking position 55 is determined, the action plan unit 43 causes the touch panel 32 to display a selection setting screen for displaying the target parking position 55 and the trajectory. After the trajectory is set, the action plan unit 43 causes the touch panel 32 to display a parking screen. When executing the automatic unparking process, the action plan unit 43 causes the touch panel 32 to display an unparking search screen for setting the target unparking position. After the target unparking position and the trajectory is selected and set, the action plan unit 43 causes the touch panel 32 to display an unparking screen.

Figure 3A:
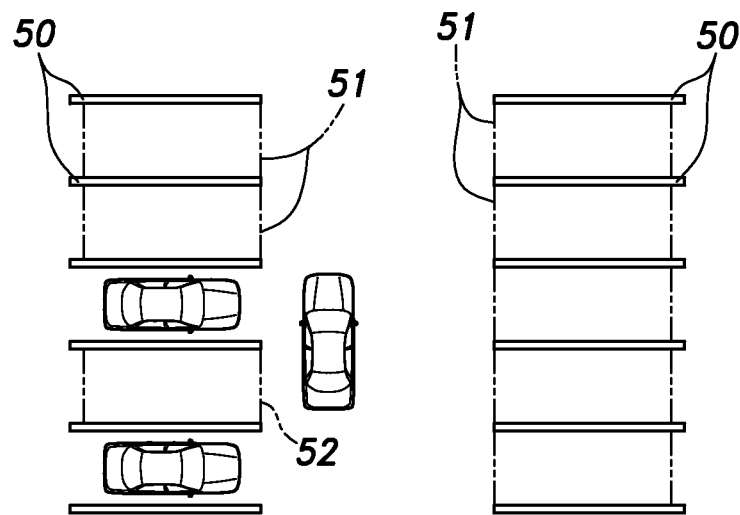
FIG. 3A is an explanatory diagram showing available parking spaces.

Hereinafter, the automatic parking process will be described with reference to FIG. 2. First, the external environment recognizing unit 41 of the control device 15 executes a parking space searching process (ST1) to search for one or more available parking spaces 51 (hereinafter sometimes simply referred to as "parking space(s) 51"). More specifically, as shown in FIG. 3A, the external environment recognizing unit 41 acquires the positions and sizes of the obstacles and the positions of the delimiting lines 50 provided on the road surface based on the signal (the first external environment information) from the external environment sensor 7. The external environment recognizing unit 41 searches for one or more parking spaces 51 delimited by the delimiting lines 50 based on the positions and sizes of the obstacles and the positions of the delimiting lines 50 that have been acquired.

More specifically, when two delimiting lines 50 on the road surface acquired from the images captured by the external cameras 19 are parallel to each other at an interval (for example, 2.3 m to 3.0 m) suitable for parking the vehicle, the external environment recognizing unit 41 recognizes the zone between the two delimiting lines 50 as the parking zone. Upon extracting the parking zone, the external environment recognizing unit 41 determines the parking type (perpendicular parking or angle parking) of the parking zone based on the angle formed between each delimiting line 50 and the line connecting the front ends (the ends on the roadway side) of the delimiting lines 50, for example.

Further, the external environment recognizing unit 41 recognizes the objects around the vehicle (the obstacles that may hinder the movement of the vehicle) detected by the sonars 18. Then, from one or more parking zones that have been extracted, the external environment recognizing unit 41 extracts the parking zones where the objects are not present as the available parking spaces 51. Namely, unoccupied parking zones where the vehicle is not parked are the available parking spaces 51. For extracting the parking spaces 51, the external environment recognizing unit 41 acquires information about the obstacles in a prescribed range based on the vehicle moving at low speed or the stopped vehicle. For example, the above prescribed range extends about 7 m to 8 m from the vehicle toward its both lateral sides, and arranged across the front side to the rear side of the vehicle.

In a case where the parking space 51 for the perpendicular parking is located on a lateral side of the vehicle and no other vehicle is parked in the parking space 51, or in a case where no obstacle is present in an area from a lateral side to a front side of the vehicle, the external environment recognizing unit 41 can recognize that the two delimiting lines 50 defining the parking space 51 have a prescribed length (for example, 5 m). In many cases (see FIG. 4A) other than the above cases, the external environment recognizing unit 41 fails to recognize the entirety of the two delimiting lines 50, even if succeeding in recognizing the front parts of the two delimiting lines 50. Even in such a case, if no obstacle is present in the parking zone delimited by the two delimiting lines 50 arranged at an interval suitable for parking the vehicle, the external environment recognizing unit 41 extracts this parking zone as the parking space 51.

In the parking space searching process (ST1) in FIG. 2, in a case where the vehicle is stopped, the action plan unit 43 of the control device 15 causes the touch panel 32 of the HMI 14 to display a notification that instructs the occupant to move the vehicle forward. The external environment recognizing unit 41 keeps on searching for the parking spaces 51 while the occupant (hereinafter referred to as "the driver") seated in the driver's seat is moving the vehicle forward.

Next, the action plan unit 43 determines whether an entrance width Wf51 (see FIG. 4A) of the parking area 52 corresponding to the parking space 51 is equal to or more than a prescribed first width Wf1 so as to confirm that the parking space 51 extracted by the external environment recognizing unit 41 is suitable for parking the vehicle (step ST2). The parking area 52 corresponding to the parking space 51 does not mean an area between the delimiting lines 50 that define the parking space 51, but means an area between left and right obstacles that define the area between the delimiting lines 50. The entrance width is the width of the entrance of the parking area 52, and means the distance between the left and right obstacles that define the parking area 52. The first width Wf1 is set as the minimum width for opening and closing the doors of the vehicle on the presumption that the parking area 52 extends from the entrance side to the back side with the entrance width. The first width Wf1 is set to a value (about 2.3 m to 2.5 m) which is greater than the vehicle width Wv (see FIG. 6) by about 60 cm, for example.

Figure 3B:
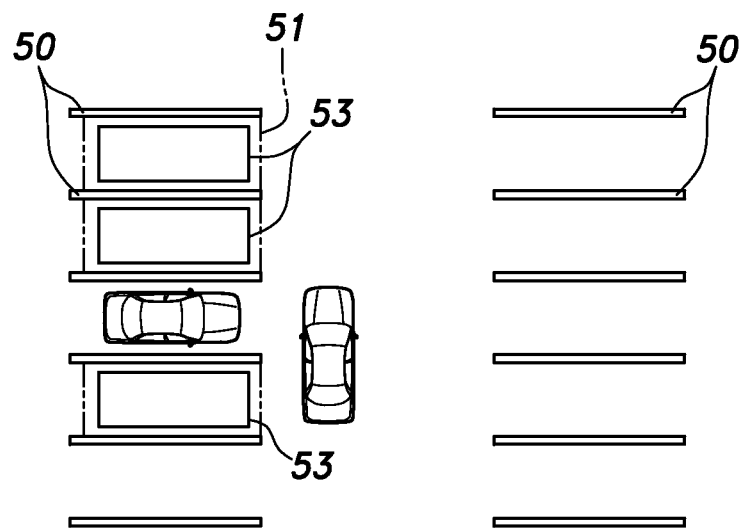
FIG. 3B is an explanatory diagram showing parking position candidates displayed to be selected.

When the entrance width Wf51 of the parking area 52 corresponding to the extracted parking space 51 is equal to or more than the first width Wf1 (ST2: Yes), as shown in FIG. 3B, the action plan unit 43 sets a parking position candidate 53 (namely, a parking position where the vehicle should be parked) in the parking space 51 (step ST3). Further, as shown in FIG. 4B, the action plan unit 43 causes the touch panel 32 to display the set parking position candidate 53 on a screen (namely, the parking search screen shown in FIG. 4A). More specifically, the action plan unit 43 sets the parking position candidate 53 in the center in the width direction of the left and right delimiting lines 50 that define the parking space 51. The parking position candidate 53 is a rectangular area having a width equal to or more than the vehicle width Wv and similar to the vehicle width Wv (for example, a width greater than the vehicle width Wv by about 10 cm to 20 cm) and having a length equal to or more than the vehicle length. Accordingly, the spaces between the left and right sides of the parking position candidate 53 and the delimiting lines 50 are even on both lateral sides of the vehicle.

Figure 4A:
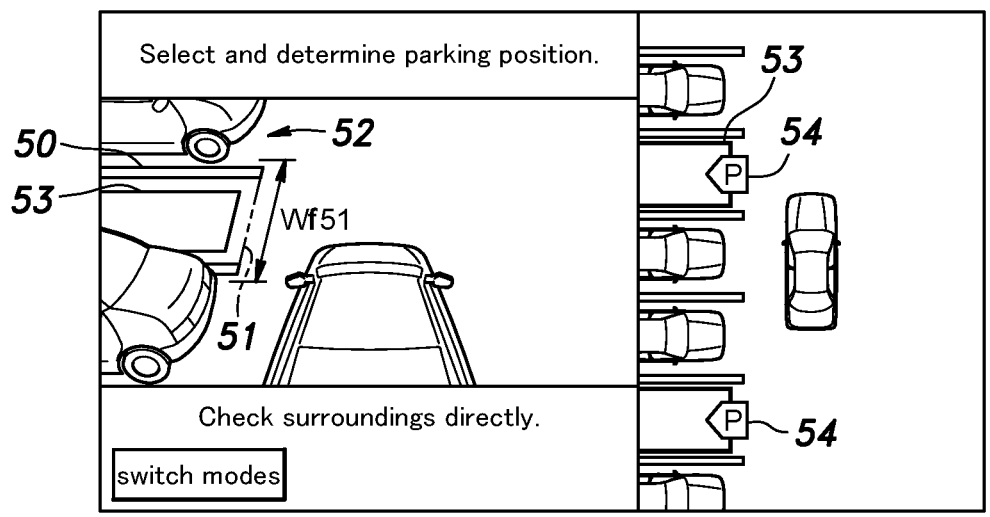
FIG. 4A is a diagram showing a parking search screen displayed on a touch panel during a parking space searching process.
Figure 4B:
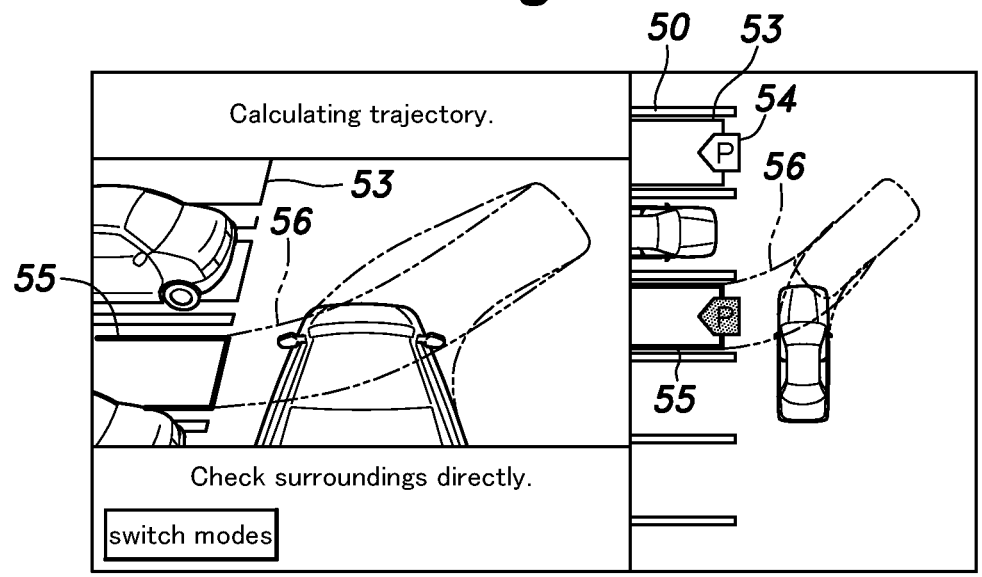
FIG. 4B is a diagram showing a selection setting screen displayed on the touch panel during the selection of a target parking position.

In a case where the external environment recognizing unit 41 extracts plural parking position candidates 53, the action plan unit 43 causes the touch panel 32 to display these parking position candidates 53 on the parking search screen shown in FIG. 4A. An upper limit number may be set for the number of parking position candidates 53 to be displayed on the touch panel 32. At this time, as shown in FIG. 3B, the action plan unit 43 sequentially acquires plural parking position candidates 53 from the external environment recognizing unit 41. When the number of detected parking position candidates 53 exceeds the upper limit number (for example, "3"), the action plan unit 43 removes the parking position candidate 53 with the lowest priority from the parking position candidates 53 to be displayed on the touch panel 32, and erases the information about the removed parking position candidate 53 from the memory. The above priority may be set according to a prescribed rule. Returning to FIG. 2, when the entrance width Wf51 of the parking area 52 corresponding to the parking space 51 is less than the first width Wf1 (ST2: No), the action plan unit 43 does not display the parking space 51 as the parking position candidate 53 on the parking search screen, and causes the external environment recognizing unit 41 to continue the parking space searching process (ST1).

Next, the action plan unit 43 executes a selection operation determining process (ST4). In the selection operation determining process, the action plan unit 43 determines whether the driver (user) has performed a selection operation to select a desired target parking position 55 from the parking position candidates 53 displayed on the touch panel 32. More specifically, the action plan unit 43 causes the touch panel 32 to display the look-down image and the bird's-eye image in the moving direction of the vehicle on the parking search screen shown in FIG. 4A. The look-down image is an image of the vehicle and its surroundings viewed from above. The look-down image is displayed with the front of the vehicle facing upward on the screen, and an image representing the vehicle is composited in the center of the surrounding image. The bird's-eye image is an image of the vehicle and a part of the surrounding area thereof positioned in the moving direction. The bird's-eye image is an image viewed downward in the moving direction from a view point above the vehicle and shifted in the direction opposite to the moving direction. The bird's-eye image is displayed so that the moving direction of the vehicle coincides with the upward direction of the screen, and an image representing the vehicle is composited at the bottom of the surrounding image.

Upon acquiring at least one parking position candidate 53, the action plan unit 43 causes the touch panel 32 to display a frame that indicates the parking position candidate 53 and an icon 54 that corresponds to the frame such that the frame and the icon 54 are superimposed on at least one of the above surrounding images (namely, at least one of the look-down image and the bird's-eye image). The icon consists of a symbol (see "P" in FIG. 4A) indicating the parking position candidate 53. Also, the action plan unit 43 causes the parking search screen of the touch panel 32 to display a notification to instruct the driver to stop the vehicle and set (select) the parking position (the target parking position 55) so as to receive the selection operation of the target parking position 55. The selection operation of the target parking position 55 may be performed via the touch panel 32, or may be performed via the selection input member 35.

In a case where an input of the selection operation of the target parking position 55 is not present (ST4: No), the action plan unit 43 causes the external environment recognizing unit 41 to continue the parking space searching process (ST1). When the selection operation of the target parking position 55 is received (ST4: Yes), the action plan unit 43 sets the selected parking position candidate 53 as the target parking position 55, and calculates a first trajectory 56 (see FIG. 4B) from the current position of the vehicle to the target parking position 55 (step ST5).

More specifically, as shown in FIG. 4A, the driver operates the selection input member 35 while looking at the parking search screen, and thus appropriately changes the parking position candidate 53 selected by a cursor and performs a determination operation by operating the touch panel 32 or the selection input member 35. Accordingly, the action plan unit 43 sets the selected parking position candidate 53 as the target parking position 55. At this time, as shown in FIG. 4B, the action plan unit 43 causes a selection setting screen of the touch panel 32 to display the target parking position 55 and the corresponding icon 54 in a color different from other icons 54 and other parking position candidates 53. The touch panel 32 is a part of the selection input member 35 in the sense that the determination operation can be performed thereon. Further, the action plan unit 43 causes the touch panel 32 to display the first trajectory 56 from the current position to the target parking position 55 such that the first trajectory 56 is superimposed on the look-down image and the bird's-eye image.

After calculating the first trajectory 56, the action plan unit 43 executes a first driving process to autonomously move the vehicle along the calculated first trajectory 56 (ST6). At this time, the action plan unit 43 controls the powertrain 4, the brake device 5, and the steering device 6 based on the position of the vehicle acquired by the GPS receiving unit 20 and the signals from the external cameras 19, the vehicle sensor 8, or the like. In this control, the action plan unit 43 switches the moving direction of the vehicle by moving the vehicle forward and backward, and controls the vehicle so as to move along the calculated first trajectory 56. At this time, the external environment recognizing unit 41 detects the obstacles around the vehicle based on the detection result (the second external environment information) of the external environment sensor 7, and stores the positions and sizes of the obstacles.

Figure 5A:
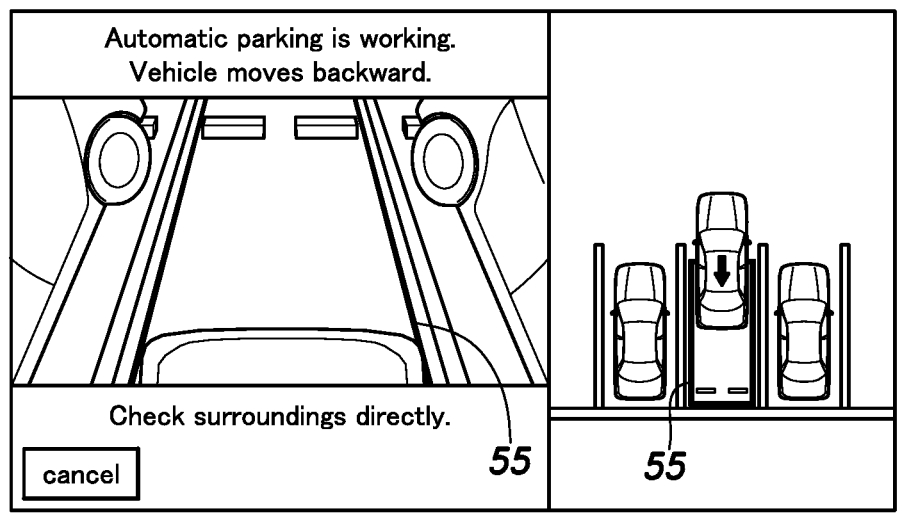
FIG. 5A is a diagram showing a parking screen displayed on the touch panel during a first driving process.

Further, after calculating the first trajectory 56, the action plan unit 43 switches the screen of the touch panel 32 from the selection setting screen to the parking screen. As shown in FIG. 5A, the parking screen is a screen in which a moving direction image (front image or back image) in the moving direction of the vehicle is displayed on the left half of the touch panel 32 and the look-down image including the vehicle and its surrounding area is displayed on the right half thereof. At this time, the action plan unit 43 may cause the touch panel 32 to display a thick frame that indicates the target parking position 55 selected from the parking position candidates 53 and the first trajectory 56 (see FIG. 4B) such that the thick frame and the first trajectory 56 are superimposed on the look-down image and the moving direction image.

During the first driving process, the action plan unit 43 acquires the moving direction image from the external cameras 19 and causes the touch panel 32 to display the acquired moving direction image on the left half thereof. For example, as shown in FIG. 5A, when the vehicle is moving backward, the action plan unit 43 causes the touch panel 32 to display the back image of the vehicle captured by the external cameras 19 on the left half thereof. While the action plan unit 43 is executing the first driving process, the surrounding image of the vehicle (the own vehicle) in the look-down image on the right half of the touch panel 32 changes according to the movement of the vehicle.

When the vehicle state determining unit 46 determines that the vehicle is in the prohibition state during the first driving process, the action plan unit 43 causes the touch panel 32 to display a notification that the automatic parking is suspended or canceled, and executes a deceleration process to decelerate the vehicle to stop the same. Thus, when there is a predetermined operation input by the occupant via the operation input member 11, the action plan unit 43 executes the deceleration process. Accordingly, it is possible to avoid uneasiness felt by the occupant due to the continuation of the movement of the vehicle.

Also, in a case where the vehicle abnormality detecting unit 45 detects the vehicle abnormality during the first driving process, the action plan unit 43 causes the touch panel 32 to display a notification that the automatic parking is canceled, and executes the deceleration process to decelerate the vehicle to stop the same. During the first driving process, the action plan unit 43 checks whether the obstacle is present within a prescribed distance from the vehicle in the moving direction thereof based on the images from the external cameras 19 and the signals from the sonars 18. Upon detecting the obstacle, action plan unit 43 causes the touch panel 32 to display a notification that the automatic parking is suspended, and executes the deceleration process to decelerate the vehicle to stop the same.

Upon suspending the automatic parking, the action plan unit 43 causes the touch panel 32 to display a resumption button and a cancellation button. The action plan unit 43 renders the resumption button inoperable while the cause of the suspension exists, and renders the resumption button operable when the cause of the suspension disappears. The resumption button may be displayed on the touch panel 32 such that whether the resumption button is operable can be recognized. When the resumption button receives an input operation, the action plan unit 43 resumes the automatic parking. While executing the first driving process, the action plan unit 43 causes the touch panel 32 to display the target parking position 55 and the first trajectory 56 on the moving direction image and the look-down image of the parking screen. Further, while executing the first driving process, the action plan unit 43 causes the touch panel 32 to display the own vehicle on the look-down image by using a figure, a photograph, a picture, and the like.

Subsequently, the action plan unit 43 executes a parking completion determining process (ST7). More specifically, when the vehicle reaches the target parking position 55, the action plan unit 43 stops the vehicle and ends the first driving process. Accordingly, the parking of the vehicle (hereinafter simply referred to as "parking") is completed. In a case where the parking is not completed (ST7: No), the action plan unit 43 continues the first driving process. On the other hand, when the parking is completed (ST7: Yes), the action plan unit 43 proceeds to step ST8.

In step ST8, the action plan unit 43 determines whether an entrance width Wf55 of the parking area 52 corresponding to the target parking position 55 is equal to or more than a second width Wf2 so as to determine whether the parking area 52 corresponding to the target parking position 55 where the vehicle is stopped has a sufficient size (width) to allow the occupant to easily alight from the vehicle. At this time, the action plan unit 43 calculates the entrance width Wf55 of the parking area 52 based on the detection result (the second external environment information) of the external environment sensor 7 (more specifically, the positional information about the obstacles detected by the sonars 18) during the first driving process and after the completion of the parking. Accordingly, the entrance width Wf55 of the parking area 52 corresponding to the target parking position 55 can be calculated more accurately than the entrance width recognized in the parking space searching process (ST1), and can be compared with the second width Wf2. The second width Wf2 is set to a value greater than the first width Wf1. For example, the second width Wf2 is set to a value (about 2.9 m to 3.1 m) greater than the vehicle width Wv by about 120 cm.

Figure 5B:
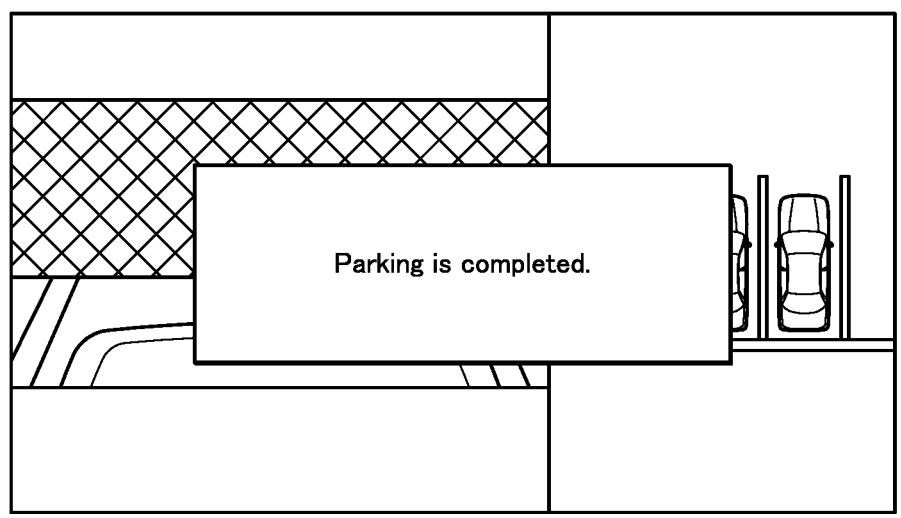
FIG. 5B is a diagram showing the parking screen displayed on the touch panel when automatic parking of the vehicle is completed.

When the entrance width Wf55 of the parking area 52 corresponding to the target parking position 55 is less than the second width Wf2 (ST8: No), the action plan unit 43 executes a parking process (step ST9). In the parking process, the action plan unit 43 first drives the shift actuator 17 to set the shift position (shift range) to a parking position (parking range). Thereafter, the action plan unit 43 drives the parking brake device, and causes the touch panel 32 to display a pop-up window (see FIG. 5B) indicating that the parking is completed. The pop-up window may be displayed on the screen of the touch panel 32 for a prescribed period. Thereafter, the action plan unit 43 may cause the touch panel 32 to switch the screen to an operation screen of the navigation device 10 or a map screen.

In a case where the entrance width Wf55 of the parking area 52 corresponding to the target parking position 55 is equal to or more than the second width Wf2 (ST8: Yes), the action plan unit 43 determines whether the space on the right side of the parking area 52 corresponding to the target parking position 55 has a sufficient size (step ST10). More specifically, the action plan unit 43 calculates the distance in the width direction from the vehicle to the obstacle on the right side based on the detection result of the external environment sensor 7 (more specifically, the positional information about the obstacles detected by the sonars 18) during the first driving process and after the completion of the parking. Subsequently, the action plan unit 43 determines whether the minimum distance Dminr (see FIG. 6) from the vehicle to the obstacle on the right side is equal to or less than a prescribed threshold Dth. The prescribed threshold Dth may be set to a half of the value acquired by subtracting the vehicle width Wv from the first width Wf1 (about 2.3 m to 2.5 m), or may be a value (about 25 cm to 40 cm) slightly smaller than the half of the acquired value. This determination is made to check whether the space on the right side corresponding to the first width Wf1 (a comparison value for the determination in step ST2) continues not only to the entrance side of the parking area 52 but also to the back side of the parking area 52.

In a case where the minimum distance Dminr from the vehicle to the obstacle on the right side is more than the prescribed threshold Dth (ST10: Yes), the action plan unit 43 determines whether the space on the left side of the parking area 52 corresponding to the target parking position 55 has a sufficient size (step ST11). More specifically, the action plan unit 43 calculates the distance in the width direction from the vehicle to the obstacle on the left side based on the detection result of the external environment sensor 7 (more specifically, the positional information about the obstacles detected by the sonars 18) during the first driving process and after the completion of the parking. Subsequently, the action plan unit 43 determines whether the minimum distance Dminl (see FIG. 6) from the vehicle to the obstacle on the left side is equal to or less than the prescribed threshold Dth. The prescribed threshold Dth may be the same as the value used in step ST10. This determination is made to check whether the space on the left side corresponding to the first width Wf1 (a comparison value for the determination in step ST2) continues not only to the entrance side of the parking area 52 but also to the back side of the parking area 52.

In a case where the minimum distance Dminl from the vehicle to the obstacle on the left side is more than the prescribed threshold Dth (ST11: Yes), the action plan unit 43 proceeds to the parking process in step ST9 since the spaces on the left and right sides each have a sufficient size.

Figure 6:
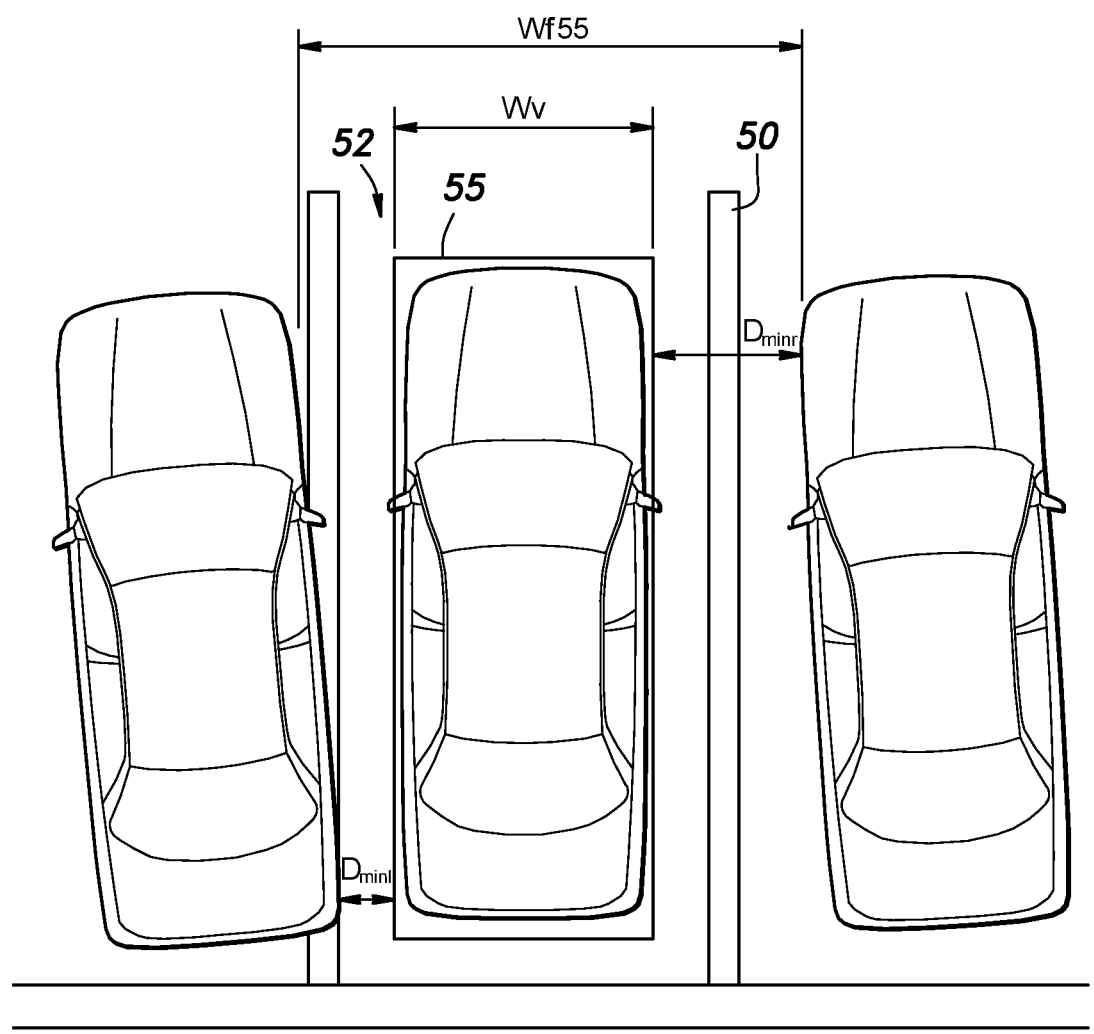
FIG. 6 is an explanatory diagram showing a parking area recognized after the vehicle is parked in a target parking position.
Figure 7:
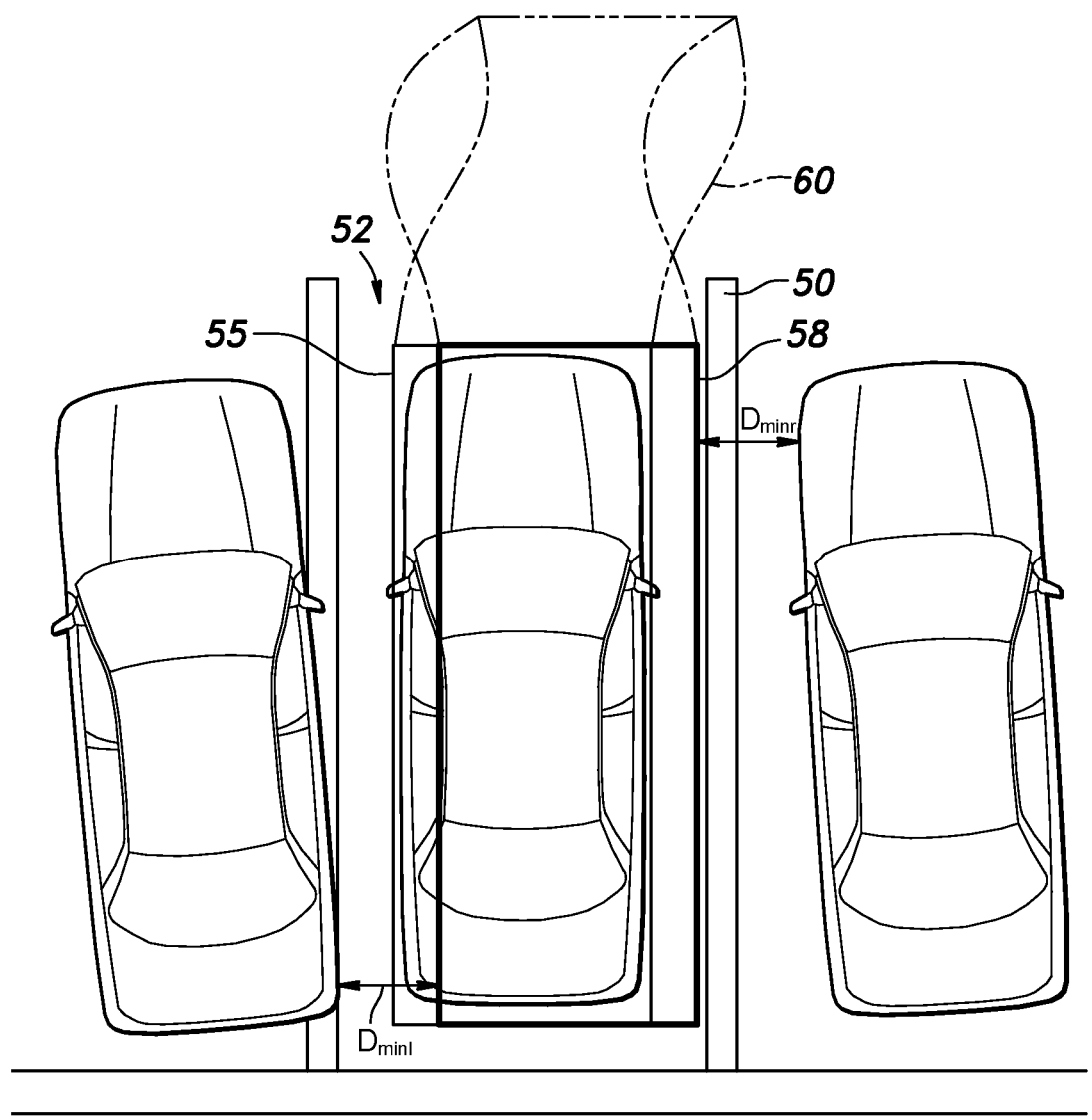
FIG. 7 is an explanatory diagram showing a corrected parking position set after the vehicle is parked in the target parking position.

On the other hand, in a case where the minimum distance Dminl from the vehicle to the obstacle on the left side is equal to or less than the prescribed threshold Dth, the determination in step ST11 becomes "No". For example, as shown in FIG. 6, in a case where another vehicle on the left side of the own vehicle is parked diagonally and approaches the own vehicle at the back part of the parking area 52, or in a case where a pillar or the like is present on the left side of the back part of the parking area 52, the determination in step ST11 becomes "No". In such a case, the action plan unit 43 sets a corrected parking position 58 at a position offset to the right side from the target parking position 55 where the vehicle is stopped (step ST12). In this case, as shown in FIG. 7, the corrected parking position 58 is a position offset to the right side in the width direction from the center of the two delimiting lines 50 so that the minimum distance Dminl on the left side is increased. More specifically, the action plan unit 43 sets the corrected parking position 58 in the parking space 51 such that the corrected parking position 58 is parallel to the delimiting lines 50 based on the position of the obstacles detected during the first driving process and after the completion of the parking. At this time, the action plan unit 43 may set the corrected parking position 58 such that the minimum distance Dminl from the vehicle to the obstacle on the left side is equal to the minimum distance Dminr from the vehicle to the obstacle on the right side.

In a case where the minimum distance Dminr from the vehicle to the obstacle on the right side is equal to or less than the prescribed threshold Dth and thus the determination in step ST10 becomes "No", similar to step ST11, the action plan unit 43 determines whether the space on the left side of the parking area 52 corresponding to the target parking position 55 has a sufficient size (step ST13). The prescribed threshold Dth may be the same as the value used in steps ST10 and ST11.

In a case where the minimum distance Dminl from the vehicle to the obstacle on the left side is equal to or less than the prescribed threshold Dth (ST13: No), the action plan unit 43 proceeds to the parking process in step ST9 since neither the space on the left side nor the space on the right side has a sufficient size.

On the other hand, when the minimum distance Dminl from the vehicle to the obstacle on the left side is more than the prescribed threshold Dth, the determination in step ST13 becomes "Yes". For example, contrary to the example shown in FIG. 6, in a case where another vehicle on the right side of the own vehicle is parked diagonally and approaches the own vehicle at the back part of the parking area 52, or in a case where a pillar or the like is present on the right side of the back part of the parking area 52, the determination in step ST13 becomes "Yes". In such a case, the action plan unit 43 sets a corrected parking position 58 at a position offset to the left side from the target parking position 55 where the vehicle is stopped (step ST14). In this case, the corrected parking position 58 is a position offset to the left side in the width direction from the center of the two delimiting lines 50 so that the minimum distance Dminr on the right side is increased. In step ST14, the action plan unit 43 sets the corrected parking position 58 in the parking space 51 such that the corrected parking position 58 is parallel to the delimiting lines 50 based on the position of the obstacles detected during the first driving process and after the completion of the parking. At this time, the action plan unit 43 may set the corrected parking position 58 such that the minimum distance Dminl from the vehicle to the obstacle on the left side is equal to the minimum distance Dminr from the vehicle to the obstacle on the right side.

After setting the corrected parking position 58 in step ST12 or step ST14, the action plan unit 43 calculates a second trajectory 60 from the target parking position 55 to the corrected parking position 58 (step ST15). More specifically, the action plan unit 43 sets the corrected parking position 58 in the parking space 51 such that the corrected parking position 58 is parallel to the delimiting lines 50 based on the position of the obstacles detected during the first driving process and after the completion of the parking. At this time, the action plan unit 43 may set the corrected parking position 58 such that the minimum distance Dminl from the vehicle to the obstacle on the left side is equal to the minimum distance Dminr from the vehicle to the obstacle on the right side. The second trajectory 60 is a trajectory in which the vehicle moves forward from the target parking position 55 where the vehicle is stopped and then moves backward to the corrected parking position 58. Namely, the second trajectory 60 is a trajectory including a switch in the moving direction of the vehicle.

After calculating the second trajectory 60, the action plan unit 43 executes a second driving process to move the vehicle along the calculated second trajectory 60 (ST16). At this time, the action plan unit 43 controls the powertrain 4, the brake device 5, and the steering device 6 based on the position of the vehicle acquired by the GPS receiving unit 20 and the signals from the external cameras 19, the vehicle sensor 8, or the like. In this control, the action plan unit 43 switches the moving direction of the vehicle by moving the vehicle forward and backward, and controls the vehicle so as to move along the calculated second trajectory 60. At this time, the external environment recognizing unit 41 detects the obstacles around the vehicle based on the detection result of the external environment sensor 7, and the action plan unit 43 executes the second driving process while checking that the contact with the obstacles does not occur.

Subsequently, the action plan unit 43 executes a correction parking completion determining process (step ST17). More specifically, when the vehicle reaches the corrected parking position 58, the action plan unit 43 stops the vehicle and ends the second driving process. Accordingly, the correction parking of the vehicle (hereinafter simply referred to as "correction parking") is completed. In a case where the correction parking is not completed (ST17: No), the action plan unit 43 continues the second driving process. On the other hand, when the correction parking is completed (ST17: Yes), the action plan unit 43 proceeds to the parking process in step ST9.

The control device 15 is configured to execute the automatic parking process as described above. Next, the operation and effect of the parking assist system 1 configured in this way will be described.

As shown in FIG. 4B, in the parking space searching process in step ST1, it may not be possible to confirm that the two delimiting lines 50 extend to the back side of the parking zone or that no obstacle is present from the entrance side to the back side of the parking zone delimited by the two delimiting lines 50. Even in such a case, the external environment recognizing unit 41 extracts the parking zone as the available parking space 51 upon recognizing an entrance side part of the parking zone. Accordingly, even if the information about the back side of the parking zone is not included in the first external environment information, this parking zone can be detected as the parking space 51 and thus presented to the driver as the parking position candidate 53.

In such a case, the extracted parking space 51 may not form a parking area 52 where no obstacle is present from the entrance side to the back side. However, even in such a case, the control device 15 sets the parking position candidate 53 in the extracted available parking space 51 in step ST3, and sets the parking position candidate 53 selected by the user as the target parking position 55 in step ST5. Accordingly, the options of the parking spaces 51 presented to the driver are increased, and thus the parking assistance becomes more convenient.

On the other hand, in steps ST12 and ST14, the control device 15 sets the corrected parking position 58, which is different from the target parking position 55, based on the second external environment information acquired by the external environment sensor 7 during and/or after the first driving process in step ST6. Then, the control device 15 calculates the second trajectory 60 from the target parking position 55 to the corrected parking position 58 in ST15, and executes the second driving process to autonomously move the vehicle along the second trajectory 60 in ST16. Accordingly, the vehicle moves from the target parking position 55 to the corrected parking position 58 without the operation input by the driver. Accordingly, it is possible to park the vehicle in an appropriate position according to the surrounding condition of the parking space 51.

Further, in step ST3, the control device 15 sets the target parking position 55 (more specifically, the parking position candidate 53 to be selected as the target parking position 55) at the central position of the parking space 51 in the width direction. Accordingly, when the vehicle moves to the target parking position 55, the external environment sensor 7 can accurately acquire the shape of the parking area 52 (more specifically, the shape of the back side of the parking area 52) corresponding to the target parking position 55. In steps ST12 and ST14, the control device 15 sets the corrected parking position 58 at a position offset from the target parking position 55 in the width direction. Accordingly, as shown in FIG. 7, the vehicle moves to the corrected parking position 58 offset from the target parking position 55 in the width direction, so that the occupant can easily alight from the vehicle.

The second external environment information, which is acquired by the external environment sensor 7 during and/or after the first driving process in step ST6, includes the positional information about the obstacles on both lateral sides of the vehicle detected by the external environment sensor 7 while the vehicle is moving to the target parking position 55. In a case where the minimum distance Dmin (Dminl or Dminr) in the width direction to either of the obstacles on both lateral sides is equal to or less than the prescribed threshold Dth (ST10 or ST11: No), the control device 15 sets the corrected parking position 58 at a position offset from the central position of the parking space 51 in such a direction that the minimum distance Dmin is increased. Accordingly, the minimum distance Dmin from a side part of a vehicle body to either of the obstacles on both lateral sides is increased, so that the occupant can easily alight from the vehicle to both lateral sides thereof.

At this time, as shown in FIG. 7, the control device 15 sets the corrected parking position 58 in the parking space 51 such that the corrected parking position 58 is parallel to the delimiting lines 50. Accordingly, the correction parking can be executed in the position and direction corresponding to the surrounding situation and appropriate for the parking space 51.

Upon determining that the entrance width Wf51 of the parking area 52 corresponding to the parking space 51 is equal to or more than the first width Wf1 which is greater than the vehicle width Wv ("Yes" in step ST2), the control device 15 sets the parking position candidate 53 in step ST3. Namely, the parking space 51 extracted based on the first external environment information can be the parking position candidate 53, if the parking area 52 corresponding to the parking space 51 has the entrance width Wf51 of the first width Wf1, which is less than the second width Wf2. Accordingly, many parking position candidates 53 can be presented to the driver via the touch panel 32, and thus the parking assistance becomes more convenient.

Upon determining that the entrance width Wf55 of the parking area 52 corresponding to the target parking position 55 is equal to or more than the second width Wf2 which is greater than the first width Wf1 ("Yes" in step ST8), the control device 15 executes the second driving process in step ST16. Namely, the second driving process is executed in a case where the entrance width Wf55 of the parking area 52 acquired based on the second external environment information is equal to or more than the second width Wf2, which is greater than the first width Wf1 necessary for setting the parking position candidate 53 based on the first external environment information. Accordingly, the second driving process is executed such that the corrected parking position 58 is offset from the target parking position 55 to some extent. Accordingly, it is possible to surely make it easier for the occupant to alight from the vehicle.

Upon determining that the entrance width Wf55 of the parking area 52 corresponding to the target parking position 55 is smaller than the second width Wf2 ("No" in step ST8), the control device 15 does not execute the second driving process. Namely, in a case where the offsetable amount of the corrected parking position 58 from the target parking position 55 is small, the second driving process is not executed. Accordingly, it is possible to prevent the driver from being annoyed by the parking assistance. Incidentally, the user selects the parking position candidate 53 as the target parking position 55 after recognizing that the parking area 52 of the parking position candidate 53 is not large. Accordingly, even if the second driving process is not executed in the above case, the user is not inconvenienced when alighting from the vehicle.

Concrete embodiments of the present invention have been described in the foregoing, but the present invention should not be limited by the foregoing embodiments and various modifications and alterations are possible within the scope of the present invention. For example, in the above embodiment, a case where the vehicle is parked in a perpendicular parking space (namely, a case where the vehicle is parked in the parking space 51 by perpendicular parking) has been described as an example. On the other hand, the present invention may be applied to a case where the vehicle is parked in an angle parking space (namely, a case where the vehicle is parked in the parking space 51 by angle parking). Further, the external environment sensor 7 may acquire the first and second external environment information by using the radar, the laser lidar, and other sensors in addition to or instead of the sonars 18 and the external cameras 19. Also, the concrete structure, arrangement, number, process content and procedure, etc. of the components/units of the embodiments may be appropriately changed within the scope of the present invention. Also, not all of the structural elements shown in the above embodiments are necessarily indispensable and they may be selectively adopted as appropriate.

The invention claimed is:

1. A parking assist system comprising:
    an external environment information acquiring device configured to acquire external environment information around a vehicle;
    a parking space extracting device configured to extract an available parking space delimited by one or more delimiting lines based on first external environment information which is the external environment information acquired by the external environment information acquiring device;
    a display device configured to display a parking position candidate set in the parking space;
    a selection input member configured to receive a selection operation by a user, the selection operation being an operation to select the parking position candidate displayed on the display device; and
    a control device configured to set the parking position candidate at a prescribed position in the parking space, to set the parking position candidate selected by the user via the selection input member as a target parking position, to calculate a first trajectory to the target parking position, and to execute a first driving process to autonomously move the vehicle along the first trajectory,
    wherein, after the vehicle reaches the target parking position, the control device is configured to set a corrected parking position different from the target parking position based on second external environment information which is the external environment information acquired by the external environment information acquiring device during and/or after the first driving process, to calculate a second trajectory from the target parking position to the corrected parking position, and to execute a second driving process to autonomously move the vehicle along the second trajectory,
    the control device is configured to set the target parking position at a central position of the parking space in a width direction, and to set the corrected parking position at a position in the parking space offset from the target parking position in the width direction,
        in a case where an entrance width of a parking area corresponding to the parking space is equal to or more than a first width which is greater than a vehicle width, the control device sets the parking position candidate,
        in a case where the entrance width of the parking area corresponding to the target parking position is equal to or more than a second width which is greater than the first width, the control device executes the second driving process, and
        in a case where the entrance width of the parking area corresponding to the target parking position is smaller than the second width, the control device does not execute the second driving process.

2. The parking assist system according to claim 1, wherein the second external environment information includes positional information about obstacles on both lateral sides of the vehicle detected by the external environment information acquiring device while the vehicle is moving to the target parking position, and
    in a case where a minimum distance in the width direction to either of the obstacles on both lateral sides of the vehicle is equal to or less than a prescribed threshold, the control device sets the corrected parking position at a position offset from the central position in such a direction that the minimum distance is increased.

3. The parking assist system according to claim 1, wherein the control device is configured to set the corrected parking position in the parking space such that the corrected parking position is parallel to the delimiting lines.

4. The parking assist system according to claim 1, wherein upon recognizing entrance side parts of the delimiting lines on both lateral sides, the parking space extracting device extracts the available parking space.

* * * * *